(12) United States Patent
Iwasaki et al.

(10) Patent No.: US 10,365,918 B2
(45) Date of Patent: Jul. 30, 2019

(54) CONTROL MEANS, IN-VEHICLE PROGRAM REWRITING DEVICE EQUIPPED WITH SAME, AND IN-VEHICLE PROGRAM REWRITING METHOD

(71) Applicants: KOBELCO CONSTRUCTION MACHINERY CO., LTD., Hiroshima-shi (JP); Kobe Steel, Ltd., Kobe-shi (JP)

(72) Inventors: Kazuhiro Iwasaki, Hiroshima (JP); Toshihiko Nishimura, Kobe (JP)

(73) Assignees: KOBELCO CONSTRUCTION MACHINERY CO., LTD., Hiroshima-shi (JP); Kobe Steel, Ltd., Kobe-shi (JP)

( * ) Notice: Subject to any disclaimer, the term of this patent is extended or adjusted under 35 U.S.C. 154(b) by 25 days.

(21) Appl. No.: 15/544,893

(22) PCT Filed: Nov. 10, 2015

(86) PCT No.: PCT/JP2015/081565
§ 371 (c)(1),
(2) Date: Jul. 20, 2017

(87) PCT Pub. No.: WO2016/117212
PCT Pub. Date: Jul. 28, 2016

(65) Prior Publication Data
US 2018/0024827 A1      Jan. 25, 2018

(30) Foreign Application Priority Data
Jan. 23, 2015   (JP) ................................. 2015-011470

(51) Int. Cl.
*G06F 9/445*     (2018.01)
*G06F 8/65*      (2018.01)
(Continued)

(52) U.S. Cl.
CPC ................ *G06F 8/65* (2013.01); *G06F 8/654* (2018.02); *G06F 11/08* (2013.01);
(Continued)

(58) Field of Classification Search
CPC . G06F 8/65; G06F 8/654; G06F 11/08; G06F 11/1433; G06F 2201/805; H04L 67/12; H04L 67/34
See application file for complete search history.

(56) References Cited

U.S. PATENT DOCUMENTS

2006/0095644 A1   5/2006  Fujita et al.
2006/0200973 A1   9/2006  Imafuku et al.
(Continued)

FOREIGN PATENT DOCUMENTS

EP    1 617 717 A1   1/2006
EP    2 822 373 A1   1/2015
(Continued)

OTHER PUBLICATIONS

Office Action dated Aug. 1, 2017 in Japanese Patent Application No. 2015-220245 (with unedited computer generated English translation).
(Continued)

*Primary Examiner* — Hanh Thi-Minh Bui
(74) *Attorney, Agent, or Firm* — Oblon, McClelland, Maier & Neustadt, L.L.P.

(57) ABSTRACT

A controller includes a communication controller having a communication area and a normal control controller having a normal control area, and is provided in a vehicle. The controller stores an update program, which is transferred via an external communication mechanism from an external server to a vehicle, in the communication controller. If it is determined, based on manipulation of a key switch to a stop position, that updating can be performed, the controller
(Continued)

transfers the update program stored in the communication controller to the normal control controller and performs rewriting. A program is thereby reliably rewritten within a short period of time to improve work efficiency.

3 Claims, 3 Drawing Sheets

(51) Int. Cl.
    *G06F 11/14*     (2006.01)
    *H04L 29/08*     (2006.01)
    *G06F 11/08*     (2006.01)
    *G06F 8/654*     (2018.01)

(52) U.S. Cl.
    CPC .......... *G06F 11/1433* (2013.01); *H04L 67/12* (2013.01); *H04L 67/34* (2013.01); *G06F 2201/805* (2013.01)

(56) References Cited

U.S. PATENT DOCUMENTS

| | | | |
|---|---|---|---|
| 2007/0005204 A1 | 1/2007 | Yamamoto et al. | |
| 2007/0214629 A1 | 9/2007 | Imafuku et al. | |
| 2009/0300595 A1 | 12/2009 | Moran et al. | |
| 2013/0031540 A1 | 1/2013 | Throop et al. | |
| 2013/0132939 A1* | 5/2013 | Murata | H02J 7/041 717/173 |
| 2013/0339721 A1* | 12/2013 | Yasuda | G07C 5/008 713/100 |
| 2015/0040384 A1 | 2/2015 | Nishiyama et al. | |
| 2017/0228236 A1* | 8/2017 | Nakahara | G05D 1/0088 |
| 2018/0005407 A1* | 1/2018 | Browning | G01C 21/32 |

FOREIGN PATENT DOCUMENTS

| | | |
|---|---|---|
| JP | 2000-76505 A | 3/2000 |
| JP | 2002-144983 A | 5/2002 |
| JP | 2006-127252 A | 5/2006 |
| JP | 2007-11734 A | 1/2007 |
| JP | 2010-125925 A | 6/2010 |
| JP | 4487007 B2 | 6/2010 |
| JP | 2014-235652 A | 12/2014 |

OTHER PUBLICATIONS

Submission of Information dated Aug. 29, 2017 in Japanese Patent Application No. 2015-220245 (with partial English language translation).
Office Action dated Jul. 16, 2018 in corresponding European Patent Application No. 15 878 901.6, 6 pages.
Extended European Search Report dated Jan. 5, 2018 in Patent Application No. 15878901.6, 8 pages.
International Search Report dated Feb. 2, 2016 in PCT/JP2015/081565 filed Nov. 10, 2015.
Extended European Search Report dated Jan. 30, 2018 in Patent Application No. 15881980.5, 14 pages.

* cited by examiner

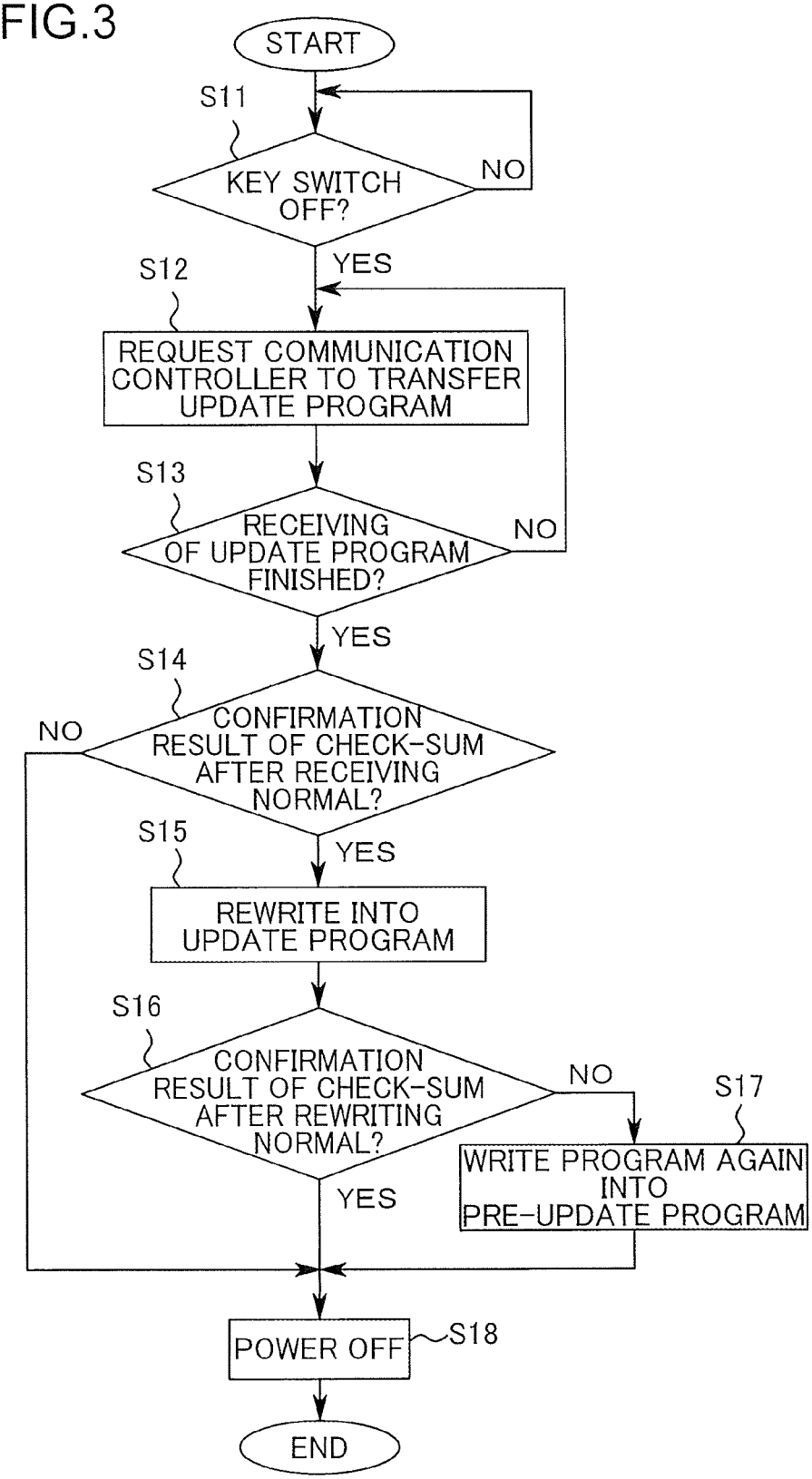

CONTROL MEANS, IN-VEHICLE PROGRAM REWRITING DEVICE EQUIPPED WITH SAME, AND IN-VEHICLE PROGRAM REWRITING METHOD

TECHNICAL FIELD

The present invention relates to a controller, used for construction machines such as excavators, that updates an in-vehicle program for collecting vehicle information, such as information representing various controls during work and an accumulated operating time, for exchanging data with the external device, and for performing other operations, an in-vehicle program rewriting device including the controller, and a method for rewriting the in-vehicle program.

BACKGROUND ART

For a construction machine connected to an external server via an external communication means, a method disclosed in Patent Literature 1 has conventionally been known as a method for rewriting an in-vehicle program into a new program, for the purpose of updating for example. In this method, when an on-board controller selects a rewrite mode based on a rewrite command from a server, the current program is rewritten by an update program sent from the external server via the external communication means to the on-board controller.

According to Patent Literature 1, data transmission from the server and rewriting of the program are directly and continuously performed on an on-board controller as described above, which typically requires a long period of time for updating.

This is likely to result in incomplete updating caused by hung-up or the like which happens by a long use of an "external communication means", which inherently has a risk of abnormal communication and reduction in the communication speed.

Besides, the time required for updating the program, that is, the period of time in which a user cannot work before completion of updating, is long, and this results in low work efficiency.

Moreover, in the method disclosed in Patent Literature 1, updating is aborted if rewriting has not been completed within a set time period, and the program is written again into the pre-update current program. In such a case, the binding time extends by the time period required to write the program again into the pre-update current program, which further worsens the work efficiency.

CITATION LIST

Patent Literature

Patent Literature 1: JP 4487007 B1

SUMMARY OF INVENTION

An object of the present invention is to provide an in-vehicle program rewriting device that reliably performs rewriting of a program within a short period of time and improves work efficiency.

To solve the aforementioned problem, the present invention provides a controller mounted on a vehicle, the controller including (i) a communication area for receiving information sent via an external communication means from a server provided outside the vehicle, a normal control area for performing normal control of the vehicle based on an in-vehicle program, and an internal communication unit that connects the communication area and the normal control area in a communicable manner, wherein (ii) the communication area includes a data storage unit that stores a received update program, and an update program transfer unit that transfers the update program stored in the data storage unit in response to a transfer request from the normal control area, and (iii) the normal control area includes an update determining unit that determines that updating can be performed when a predetermined program updating condition is satisfied, a transfer requesting unit that requests the communication area to transfer the update program when the update determining unit determines that updating can be performed, and a program updating unit that rewrites the in-vehicle program using the update program transferred from the communication area.

Furthermore, the present invention provides a method for rewriting an in-vehicle program, the method including preparing a controller that includes a communication area for receiving information sent from outside a vehicle and a normal control area for performing a normal control of the vehicle, and is provided in the vehicle, storing an update program in the communication area of the controller, the update program being sent via an external communication means from a server provided outside the vehicle, and when a program updating condition previously set in the normal control area is satisfied, transferring the update program stored in the communication area from the communication area to the normal control area, and rewriting an in-vehicle program using the update program.

Furthermore, the present invention provides an in-vehicle program rewriting device including the controller and a server provided outside the vehicle.

According to the present invention, the program is reliably rewritten within a short period of time to improve work efficiency.

BRIEF DESCRIPTION OF DRAWINGS

FIG. 3 is a flowchart for describing a process performed by a normal control controller of the embodiment.

DESCRIPTION OF EMBODIMENTS

An embodiment of the present invention will be described below with reference to the attached drawings. It should be noted that the following embodiment is an example of a specific embodiment of the present invention and should not limit the technical scope of the present invention.

Figure 1:
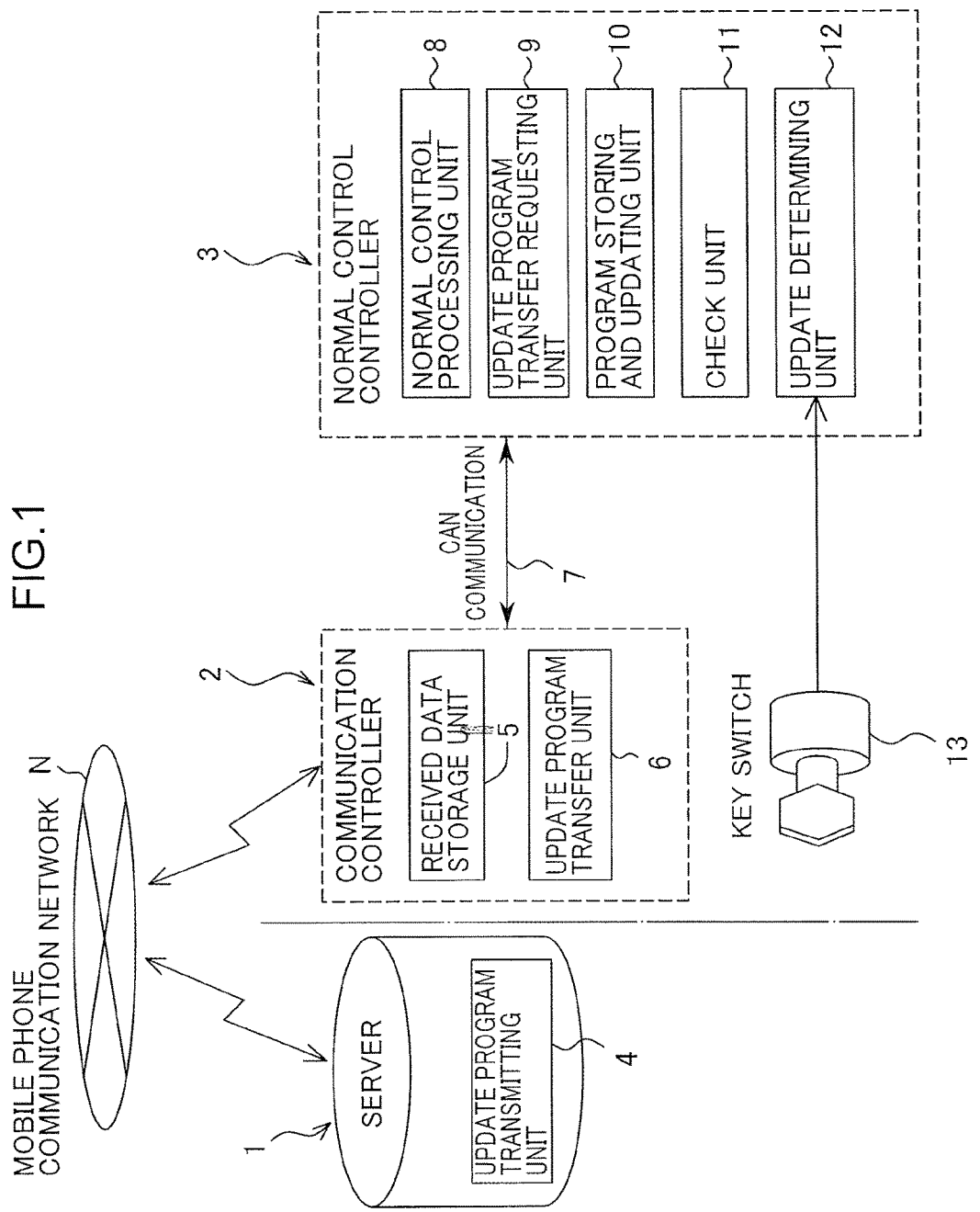
FIG. 1 is a system configuration diagram illustrating an embodiment of the present invention.

FIG. 1 illustrates a system configuration of an in-vehicle program rewriting device according to an embodiment.

The device includes a server 1 as equipment provided outside a vehicle, such as an excavator, and a controller (reference sign is omitted) as equipment mounted on the vehicle, where the server 1 is illustrated in the left side of alternate long and short dashed lines and the controller is illustrated in the right side of the alternate long and short dashed lines.

The server 1 includes an update program transmitting unit 4 that sends, for example, an update program for updating the in-vehicle program provided in the vehicle via an external communication means (e.g., a mobile phone communication network in this embodiment) N to a communication controller 2.

The controller includes the communication controller 2 having a communication area for receiving information sent from the server 1 via the external communication means N, a normal control controller 3 provided separately from the communication controller 2 and having a normal control area for performing normal control of the vehicle based on the in-vehicle program, and a communication line (internal communication unit) 7 that connects the communication area (communication controller 2) and the normal control area (normal control controller 3) in a communicable manner.

The communication controller 2 includes a received data storage unit 5 that stores the update program received from the server 1, and an update program transfer unit 6 that transfers the update program stored in the received data storage unit 5 in response to a transfer request from the normal control controller 3.

The communication line 7 connects the communication controller 2 and the normal control controller 3 so as to allow data exchange via communication using a controller area network (CAN).

The normal control controller 3 includes a normal control processing unit 8 that performs normal control for an excavator vehicle for example, controlling of a hydraulic pump, and controlling of other operations, an update program transfer requesting unit 9 that requests the communication controller 2 to transfer the update program, a program storing and updating unit 10 that stores the update program transferred from the communication controller 2 and rewrites the current in-vehicle program using the stored update program, a check unit 11 that checks whether or not any error exists in data during storing and updating of the program, and an update determining unit 12 that determines whether or not updating can be performed.

The check unit 11 performs a check-sum to check the total value of previously quantified data by two steps, namely, on the received data and on the rewritten data.

That is, the check unit 11 performs a first check to check whether or not any error exists in the update program transferred from the communication controller 2 and a second check to check whether or not any error exists in the rewritten in-vehicle program. If an error is found in the first check, the normal control controller 3 will not rewrite the in-vehicle program. If an error is found in the second check, the normal control controller 3 writes the updated in-vehicle program again into the pre-update in-vehicle program (current in-vehicle program) as will be described later.

The update determining unit 12 determines that updating can be performed when the predetermined program updating condition has been satisfied. Specifically, the update determining unit 12 determines that the program updating condition has been satisfied when a key switch 13 for starting and stopping an engine, not shown, has been manipulated to the stop position, namely, when the work has been stopped. The program updating process thereby starts.

Specifically, when the update determining unit 12 determines that updating can be performed, the update program transfer requesting unit 9 requests the communication controller 2 to transfer the update program.

The operation in this case will be described using the flowcharts in FIGS. 2 and 3.

Figure 2:
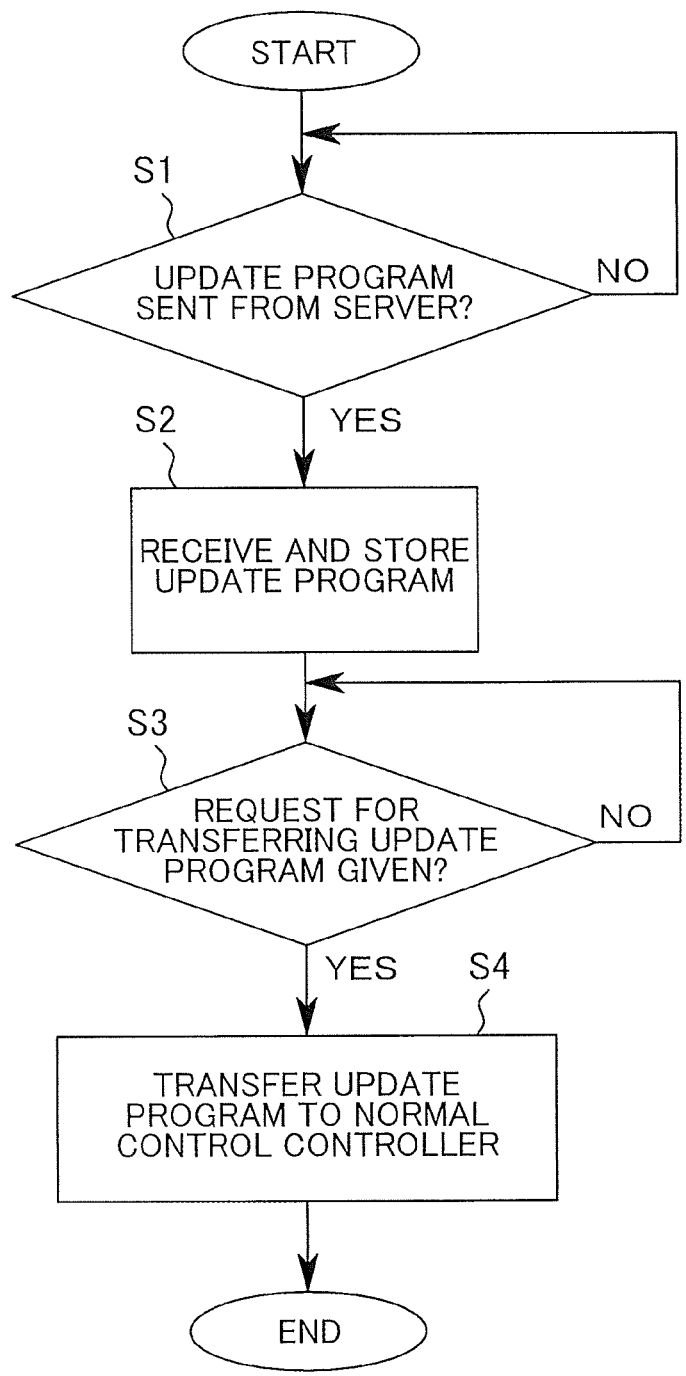
FIG. 2 is a flowchart for describing a process performed by a communication controller of the embodiment.

FIG. 2 illustrates the process performed by the communication controller 2 when the update program is sent from the server 1, to update the in-vehicle program, for example, to a new version. FIG. 3 illustrates the process performed by the normal control controller 3 in response to the process performed by the communication controller 2.

When the process in FIG. 2 is started, whether or not the update program has been sent from the server 1 in step S1 is determined. If YES, the update program is received and stored in step S2.

In the next step S3, whether or not a transfer request for the update program has been given by the normal control controller 3 is determined. If YES (request given), step S4 is performed, and if NO (request not given), step S3 is repeated.

If the transfer request has been given in step S3, the update program is transferred to the normal control controller 3 in step S4 and the process in the communication controller 2 ends.

In contrast, the normal control controller 3 performs processes of steps S11 to S18 in FIG. 3.

In step S11, whether or not the key switch 13 illustrated in FIG. 1 has been manipulated to the stop position (whether or not work is still being performed, that is, whether or not updating of the program can be performed) is determined.

If NO in step S11 (the key switch 13 still on), updating cannot be performed since the work is still being performed, and step S11 is repeated.

If YES (the key switch 13 turned off) in step S11, the update program transfer requesting unit 9 requests the communication controller 2 to transfer the update program in step S12 (on receiving the transfer request, the update program is transferred from the communication controller 2 to the normal control controller 3).

In the next step S13, whether or not the update program has been received is determined. If NO in step S13, the process returns to step S12.

If YES in step S13, whether or not the confirmation result of the check-sum (the result of the first check performed by the check unit 11) of the received update program is normal is determined in step S14.

If YES (no abnormality), the program storing and updating unit 10 rewrites the update program in step S15.

Then, in step S16, whether or not the confirmation result of the check-sum of the rewritten in-vehicle program checked by the check unit 11 in the second check is normal is determined. If normal (YES) in step S16, the power is turned off in step S18 to end the rewriting process.

In contrast, if NO in step S14, that is, if the result of the first check is abnormal, the process proceeds directly to step S18 and the power is turned off in step S18 without updating the program.

Meanwhile, if NO in step S16, that is, if the result of the second check is abnormal, the step S17 is performed. In step S17, updating of the program is disabled, and the rewritten in-vehicle program is written again into the pre-update in-vehicle program, which is stored in the storage region of the program storing and updating unit 10. Then, in step S18, the power is turned off.

In this manner, using the vehicle-mounted controller including the communication controller 2 having the communication area and the normal control controller 3 having the normal control area, the communication controller 2 transfers the data (update program) from the external server 1 to the vehicle and stores the data. If the normal control controller 3 determines that updating can be performed (when the key switch 13 has been manipulated to the stop position), the update program stored in the communication controller 2 is transferred to the normal control controller 3 and the in-vehicle program is rewritten. Thus, transfer of data from the server 1 using the mobile phone communication network N, which is the external communication means, can be performed during work.

The work needs to be stopped only for the time period required for transferring data from the communication controller 2 to the normal control controller 3 using CAN communication via the communication line (internal communication unit) 7, which provides stable communication, and for rewriting the in-vehicle program. Thus, rewriting of the in-vehicle program can reliably be performed within a short period of time.

Furthermore, the communication area and the normal control area respectively are configured by different controllers 2 and 3, and data is exchanged between the controllers 2 and 3 via the communication line (internal communication unit) 7 using the CAN communication. Thus, while the communication controller 2 is receiving the update program from the server 1, the normal control controller 3 can perform a normal work without being affected by receiving of the update program. Furthermore, the time required for rewriting can further be shortened by speeding up the data transfer, thereby reducing consumption of an on-board battery.

The controllers 2 and 3 can separately be set at each suitable place, which enables easy mounting of the controller.

Furthermore, to find any error in the data, the check unit 11 checks the check-sum two times, namely, during transfer of the update program and after rewriting of the in-vehicle program, so that malfunctions in controlling the vehicle is prevented and the machine is thereby protected.

When an error in the rewritten in-vehicle program is detected by the second check, the updated in-vehicle program is written again into the pre-update in-vehicle program. This prevents malfunctions in controlling the vehicle caused by an erroneous in-vehicle program and thus the vehicle can keep running at a pre-update level.

Other Embodiments (1) In the embodiment described above, the communication area and the normal control area provided in the vehicle are separately provided in different controllers (the communication controller and the normal control controller) 2 and 3. Alternatively, both the areas may be provided in a single controller provided in the vehicle.

(2) In the embodiment described above, the update determining unit 12 determines based on manipulation of the key switch 13 whether or not updating of the program can be performed. This however is not the only criterion to determine whether to update the program. Whether or not updating of the in-vehicle program can be performed can be determined based on, for example, manipulation of a platform-block-lever provided at the operator platform of an excavator (manipulation indicating that the operator has exit, or the work has been stopped), a predetermined switch, or a combination of a plurality of manipulations including those of the platform-block lever and the predetermined switch.

(3) The embodiment describes the case where the check unit 11 performs a check-sum to check the total value of the previously quantified data. Alternatively, other checking methods, such as a cyclic redundancy check (CRC) can be used.

(4) Data can be exchanged between the communication controller 2 and the normal control controller 3 not only using the controller area network (CAN) as in the embodiment described above but also using other communication method or standard, such as the Flex Ray.

The specific embodiment described above mainly includes the invention configured as described below.

Specifically, the present invention provides a controller mounted on a vehicle, the controller including (i) a communication area for receiving information sent via an external communication means from a server provided outside the vehicle, a normal control area for performing normal control of the vehicle based on an in-vehicle program, and an internal communication unit that connects the communication area and the normal control area in a communicable manner, wherein (ii) the communication area includes a data storage unit that stores a received update program, and an update program transfer unit that transfers the update program stored in the data storage unit in response to a transfer request from the normal control area, and (iii) the normal control area includes an update determining unit that determines that updating can be performed when a predetermined program updating condition is satisfied, a transfer requesting unit that requests the communication area to transfer the update program when the update determining unit determines that updating can be performed, and a program updating unit that rewrites the in-vehicle program using the update program transferred from the communication area.

Furthermore, the present invention provides a method for rewriting an in-vehicle program, the method including preparing a controller that includes a communication area for receiving information sent from outside a vehicle and a normal control area for performing a normal control of the vehicle, and is provided in the vehicle, storing an update program in the communication area of the controller, the update program being sent via an external communication means from a server provided outside the vehicle, and when a program updating condition previously set in the normal control area is satisfied, transferring the update program stored in the communication area from the communication area to the normal control area, and rewriting an in-vehicle program using the update program.

According to the controller and the method for rewriting an in-vehicle program, using the controller mounted on a vehicle and including the communication area and the normal control area, transfer of data (update program) from the external server to the vehicle and storing of the data are performed in the communication area. When it is determined that updating can be performed because the program updating condition previously set in the normal control area is satisfied (for example, when a key switch of the vehicle has been manipulated to the stop position), the update program stored in the communication area is transferred to the normal control area and the in-vehicle program is rewritten. Thus, transfer of data from the server using the external communication means can be performed during work.

Thus, the work needs to be stopped only for the time period required for transferring data from the communication area to the normal control area via the internal communication unit, which provides stable communication, and for rewriting of the in-vehicle program. Thus, rewriting of the in-vehicle program can reliably be performed within a short period of time.

Furthermore, the controller is partitioned into the communication area and the normal control area, and communication between the communication area and the normal control area is performed by the internal communication unit. Thus, while receiving the update program from the server in the communication area, a normal work can be performed in the normal control area without being affected by receiving of the update program.

Preferably, the controller includes the communication controller having the communication area, and the normal control controller provided separately from the communication controller and having the normal control area, wherein the internal communication unit connects the communication controller and the normal control controller.

In this manner, both the controllers can separately be set at each suitable place, which enables easy mounting of the controller.

Preferably, in the controller, the normal control controller includes a check unit that performs a first check to check whether or not any error exists in the update program transferred from the communication controller and a second check to check whether or not any error exists in the rewritten in-vehicle program.

With such a configuration, damages in data caused during data transmission can be checked by two-steps to prevent malfunctions in controlling the vehicle, and the machine is thereby protected.

In this case, when an error in the rewritten in-vehicle program is detected by the second check, the normal control controller preferably writes the in-vehicle program again into the pre-update in-vehicle program.

In this manner, the updated in-vehicle program is written again into the pre-update in-vehicle program. This prevents malfunctions in controlling the vehicle caused by the erroneous in-vehicle program and the vehicle can keep working at a pre-update level.

Furthermore, the present invention provides an in-vehicle program rewriting device including the controller and a server provided outside the vehicle.

The invention claimed is:

1. An in-vehicle program rewriting device to be mounted on a construction machine for executing a work operation in accordance with an in-vehicle program, the in-vehicle program rewriting device receiving an update program sent via an external transmitter from a server provided outside the construction machine to rewrite the in-vehicle program, comprising:
   a communication controller for receiving the update program via the external transmitter from the server;
   a normal control controller provided separately from the communication controller and adapted for performing normal control of the work operation based on the in-vehicle program; and
   an internal communication unit that connects the communication controller and the normal control controller with each other, wherein
   the communication controller includes a data storage unit that stores the received update program, and an update program transfer unit that transfers the update program stored in the data storage unit in response to a transfer request from the normal control controller, and
   the normal control controller includes:
      an update determining unit that determines that when one of a key switch, a platform-block-lever and a predetermined switch for starting and stopping an engine is manipulated to a stop position, the program updating is started,
      a transfer requesting unit that requests the communication controller to transfer the update program when the update determining unit determines that updating is acceptable,
      a program updating unit that rewrites the in-vehicle program using the update program transferred from the communication controller,
      a check unit that performs a first check to check whether or not any error exists in the update program transferred from the communication controller and a second check to check whether or not any error exists in the rewritten in-vehicle program; and
      a normal control processing unit that performs a normal control of the construction machine based on the in-vehicle program, the normal control including controlling of a hydraulic pump of the construction machine.

2. The in-vehicle program rewriting device according to claim 1, wherein
   the normal control controller writes the in-vehicle program again into the pre-update in-vehicle program when an error in the rewritten in-vehicle program is detected by the second check.

3. A method for rewriting an in-vehicle program stored in a construction machine for executing in accordance with the in-vehicle program, the in-vehicle program being rewritten by an update program received via an external transmitter from a server provided outside the construction machine, the method comprising:
   receiving the update program by a communication controller provided separately from a normal control controller for performing a normal control of the construction machine based on the in-vehicle program, the normal control including controlling of a hydraulic pump of construction machine, the work being stopped when one of a key switch, a platform-block-lever and a predetermined switch for starting and stopping an engine is manipulated to a stop position;
   storing the update program in the communication controller;
   determining that the one of a key switch, a platform-block-lever and a predetermined switch for starting and stopping an engine is manipulated to the stop position and the program updating is started;
   transferring the update program from the communication controller to the normal control controller,
   rewriting the in-vehicle program using the transferred update program; and
   performing a first check to check whether or not any error exists in the update program transferred from the communication controller and a second check to check whether or not any error exists in the rewritten in-vehicle program.

* * * * *